D. KENDALL.
COMBINED INGOT STRIPPER AND CHARGER.
APPLICATION FILED MAY 17, 1909.
945,548.
Patented Jan. 4, 1910.
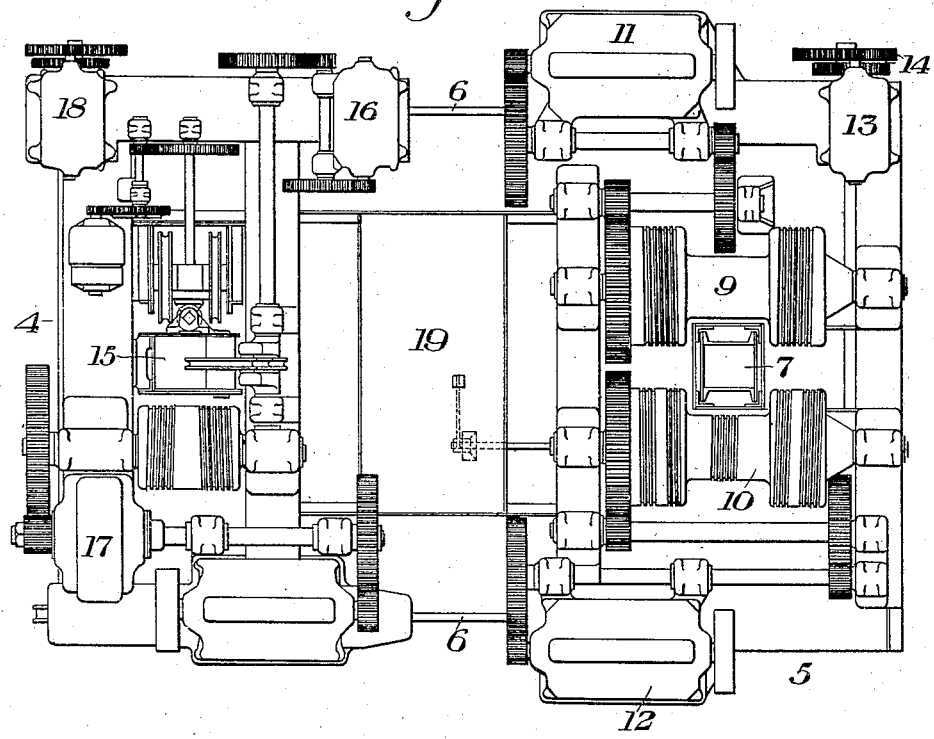
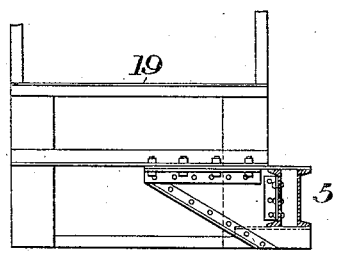

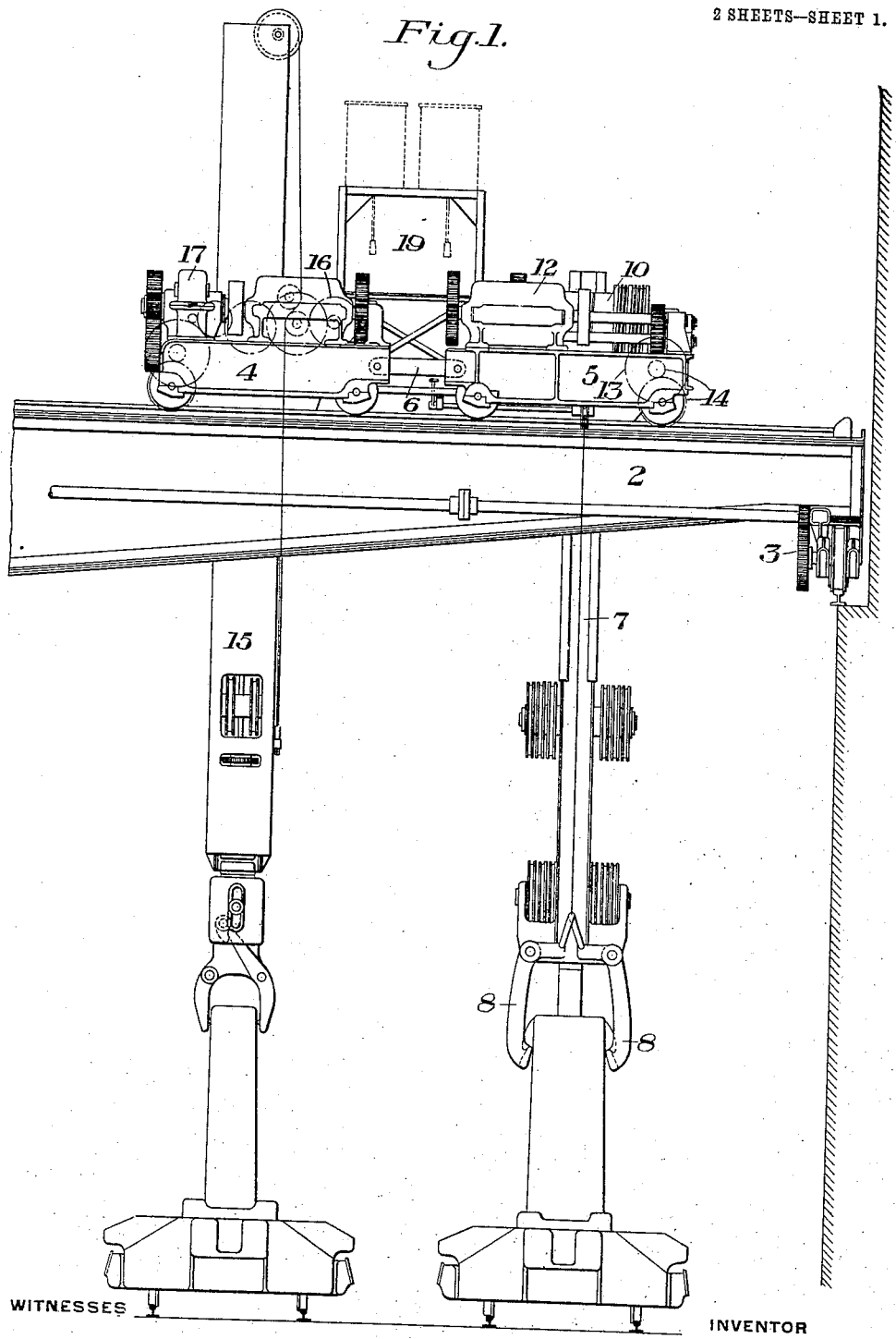

UNITED STATES PATENT OFFICE.

DAVID KENDALL, OF ALLIANCE, OHIO, ASSIGNOR TO THE ALLIANCE MACHINE COMPANY, OF ALLIANCE, OHIO, A CORPORATION OF OHIO.

COMBINED INGOT STRIPPER AND CHARGER.

945,548.  Specification of Letters Patent.  Patented Jan. 4, 1910.

Application filed May 17, 1909. Serial No. 496,434.

*To all whom it may concern:*

Be it known that I, DAVID KENDALL, of Alliance, Stark county, Ohio, have invented a new and useful Combined Ingot Stripper and Charger, of which the following is a full, clear, and exact description, reference being had to the accompanying drawings, forming part of this specification, in which—

Figure 1 is a front elevation of a combined ingot stripper and charger embodying my invention; Fig. 2 is a plan view of the same; Fig. 3 is a front view showing a portion of the ingot stripper carriage or trolley disconnected from the charging carriage or trolley.

My invention has relation to combined ingot stripping and charging mechanism of the general character shown in the patent to Cromwell and Lash, No. 865,240, dated September 3, 1907. In the apparatus shown in that patent, the ingot stripper and the ingot carrier or charger are separably mounted upon a movable carriage which is, in turn, supported upon a traveling crane, the stripper and the carrier or charger being arranged in transverse alinement so that after the mold is stripped off the ingot, the carriage may be moved over a car which receives the empty molds, and brought back to a point where the charger is in exact vertical alinement with the stripped ingot, without any necessity for working the crane back and forth to secure this alinement. In that patent, the traveling carriage or trolley is formed as one structure, and if anything happens to either the stripping mechanism or the charging mechanism, the entire trolley has to be stopped while repairs are being made.

The present invention is designed to obviate this difficulty and to provide means whereby both the stripping and the charging or carrying mechanism may be operated together in the same manner as in the said patent, or may be disconnected and separately and independently operated.

The precise nature of my invention will be best understood by reference to the accompanying drawings, which will now be described, it being premised, however, that my invention is independent of the particular charging and stripping mechanisms therein shown, and which are illustrative only, the invention consisting in the relation and manner of providing for the connection and disconnection of the two mechanisms of whatever specific character they may be.

In these drawings, the numeral 2 designates the traveling crane bridge, which is of the usual type and which is provided with the motor-driven gearing 3, by means of which it may be moved backward and forward upon its supporting girders or tracks in the usual manner. Mounted upon this crane bridge 2 are the two trolleys or carriages 4 and 5, these trolleys or carriages being structurally independent of each other and normally connected together by means of the bars or links 6. Mounted upon the trolley or carriage 5 is a stripping column 7, provided at its lower end with suitable tongs 8 or other mold-engaging devices, the column and tongs being actuated by the winding drums 9 and 10, driven by the electric motors 11 and 12 on the carriage 5.

13 is the motor and 14 the gearing by which the carriage 5 may be moved back and forth on the bridge 2.

Mounted on the trolley or carriage 4 is the ingot-carting or charging device 15, actuated by the motors 16 and 17.

18 is a motor mounted on the carriage or trolley 4, by means of which said carriage or trolley may be propelled backward and forward on the bridge 2.

19 designates the operator's platform which spans the two trolleys or carriages in their normal connected relation, being partially supported by both trolleys or carriages, but capable of independent overhung support on either one of said carriages alone, as shown in Fig. 3.

Should either the stripping mechanism or the charging and carrying mechanism get out of repair, or should it be desired to use either of these mechanisms independently of the other, the links 6 are disconnected and the operator's platform 19 is also disconnected from the carriage or trolley which it is not desired to use. The two mechanisms are then separate and independent of each other and may be so operated, each trolley or carriage having its own propelling motor.

As before stated, the present invention has nothing to do with the details of either the stripping or the charging mechanisms, and I propose to use any desired form of ingot stripper and any desired form of charging and carrying device.

I claim:

1. A combined ingot stripper and charger, comprising a traveling crane, a trolley or carriage mounted thereon and carrying ingot-stripping mechanism, another trolley or carriage also mounted on the traveling crane and having ingot-carrying mechanism supported thereby, and means whereby the two trolleys or carriages may be connected to operate as one or disconnected for independent operation, substantially as described.

2. Ingot stripping and charging mechanism, comprising a support, a trolley or carriage movably mounted thereon and carrying ingot-stripping mechanism, a second trolley or carriage also movably mounted thereon and supporting ingot-carrying mechanism, and means whereby the two carriages may be connected to operate as one or disconnected for separate operation, each carriage having independent propelling means, substantially as described.

3. Ingot-stripping and charging mechanism, comprising a traveling crane, two carriages or trolleys mounted thereon, ingot-stripping mechanism supported by one carriage or trolley, ingot-carrying and charging mechanism supported by the other carriage or trolley, detachable connections between the two carriages or trolleys, and an operator's platform arranged to be carried jointly by the two carriages or trolleys and independently by either one alone, substantially as described.

In testimony whereof, I have hereunto set my hand.

DAVID KENDALL.

Witnesses:
HOMER KENDALL,
J. J. BROWN.